United States Patent
Shibata

(10) Patent No.: US 10,521,164 B2
(45) Date of Patent: Dec. 31, 2019

(54) IMAGE-FORMING-APPARATUS MANAGING DEVICE, IMAGE-FORMING-APPARATUS MANAGING METHOD, IMAGE-FORMING-APPARATUS MANAGING PROGRAM, AND IMAGE FORMING SYSTEM

(71) Applicant: KONICA MINOLTA, INC., Chiyoda-ku, Tokyo (JP)

(72) Inventor: Koichi Shibata, Sakai (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/013,156

(22) Filed: Jun. 20, 2018

(65) Prior Publication Data
US 2018/0373476 A1 Dec. 27, 2018

(30) Foreign Application Priority Data
Jun. 22, 2017 (JP) .................. 2017-122119

(51) Int. Cl.
*G06F 3/12* (2006.01)
(52) U.S. Cl.
CPC ............ *G06F 3/1231* (2013.01); *G06F 3/123* (2013.01); *G06F 3/1203* (2013.01); *G06F 3/1204* (2013.01); *G06F 3/1285* (2013.01); *G06F 3/1273* (2013.01)
(58) Field of Classification Search
CPC ....... G06F 3/1231; G06F 3/1204; G06F 3/123
USPC ........................................................ 358/1.13
See application file for complete search history.

(56) References Cited

U.S. PATENT DOCUMENTS

| 8,725,884 B2 | 5/2014 | Kubota et al. | |
| 2006/0082802 A1* | 4/2006 | Furuya | G06F 3/1206 358/1.13 |
| 2010/0315674 A1* | 12/2010 | Shimizu | G06F 3/1204 358/1.15 |
| 2012/0268782 A1* | 10/2012 | Hamaguchi | G06F 3/1204 358/1.15 |
| 2015/0206036 A1* | 7/2015 | Byer | G06F 3/1227 358/1.13 |

(Continued)

FOREIGN PATENT DOCUMENTS

| CN | 101488867 A | 7/2009 |
| JP | 2015-180991 A | 10/2015 |

OTHER PUBLICATIONS

First Office Action dated Sep. 4, 2019, by the Chinese Patent Office in corresponding Chinese Patent Application No. 201810626194.4, and an English Translation of the Office Action. (14 pages).

*Primary Examiner* — Neil R McLean
(74) *Attorney, Agent, or Firm* — Buchanan Ingersoll & Rooney PC

(57) ABSTRACT

An image-forming-apparatus managing device includes: a memory that stores a plurality of pieces of setting data of an image forming apparatus; a communication interface that communicates with the image forming apparatus; and a hardware processor that writes the plurality of pieces of setting data into the image forming apparatus, wherein the hardware processor writes the plurality of pieces of setting data into the image forming apparatus in a mode appropriate to order of priority in the plurality of pieces of setting data based on a characteristic of the image forming apparatus.

14 Claims, 9 Drawing Sheets

(56) References Cited

U.S. PATENT DOCUMENTS

| | | | | |
|---|---|---|---|---|
| 2015/0249769 A1* | 9/2015 | Asahara | ............ | H04N 1/00962 |
| | | | | 358/1.13 |
| 2015/0370650 A1* | 12/2015 | Tajima | ................. | G06F 21/608 |
| | | | | 707/647 |
| 2017/0019565 A1* | 1/2017 | Shiratori | ............ | H04N 1/00204 |
| 2018/0275934 A1* | 9/2018 | Takenaka | .............. | G06F 3/1258 |

\* cited by examiner

MODEL-TO-DATA-SET CONVERSION TABLE 300

| MODEL | FIRST DATA SET | SECOND DATA SET | THIRD DATA SET |
|---|---|---|---|
| MODEL A | – | ○ | – |
| MODEL B | – | – | ○ |
| MODEL C | ○ | – | – |
| MODEL D | ○ | – | – |

*FIG. 8*

FUNCTION-TO-GROUP CONVERSION TABLE 500

| FUNCTION | FIRST DATA SET | SECOND DATA SET | THIRD DATA SET |
| --- | --- | --- | --- |
| PRINTING | FIRST GROUP | FIRST GROUP | FIRST GROUP |
| SCANNING | SECOND GROUP | SECOND GROUP | SECOND GROUP |
| SECURITY COMMUNICATION | THIRD GROUP | — | THIRD GROUP |
| ⋮ | ⋮ | ⋮ | ⋮ |

FIG. 9

```
        WRITING OF SETTING DATA
                   ↓
   ┌─────────────────────────────────────┐  S102
   │ INQUIRE ABOUT MODEL AND USAGE HISTORY│
   └─────────────────────────────────────┘
                   ↓
   ┌─────────────────────────────────────┐  S103
   │   ACQUIRE MODEL AND USAGE HISTORY    │
   └─────────────────────────────────────┘
                   ↓
   ┌─────────────────────────────────────┐  S110
   │   READ DATA SET CORRESPONDING TO MODEL│
   └─────────────────────────────────────┘
                   ↓
   ┌─────────────────────────────────────┐  S122
   │ WRITE SETTING DATA OF DATA SET READ  │
   │ INTO X-TH IMAGE FORMING APPARATUS    │
   │ IN ORDER BASED ON USAGE HISTORY      │
   └─────────────────────────────────────┘
                   ↓
   ┌─────────────────────────────────────┐  S130
   │              X → X+1                 │
   └─────────────────────────────────────┘
                   ↓          S140
           NO   ◇ X > N? ◇
         ←─────
                   ↓ YES
                  END
```

FIG. 10

USAGE HISTORY OF FUNCTIONS

| FUNCTION | USAGE |
|---|---|
| PRINTING | 2056 |
| SCANNING | 45 |
| SECURITY COMMUNICATION | 600 |
| ⋮ | . | ns
IMAGE-FORMING-APPARATUS MANAGING DEVICE, IMAGE-FORMING-APPARATUS MANAGING METHOD, IMAGE-FORMING-APPARATUS MANAGING PROGRAM, AND IMAGE FORMING SYSTEM

The entire disclosure of Japanese patent Application No. 2017-122119, filed on Jun. 22, 2017, is incorporated herein by reference in its entirety.

BACKGROUND

Technological Field

The present disclosure relates to writing of setting data into at least two image forming apparatuses by an image-forming-apparatus managing device.

Description of the Related Art

Conventional image forming apparatuses need to have, for example, setting data for printing color written after factory shipment. For example, JP 2015-180991 A discloses a technique of managing to enable or disable export for each set value of an application in an image forming apparatus including the application installed.

In recent years, because of installation of a plurality of image forming apparatuses in an office, simultaneous writing of setting data into the plurality of image forming apparatuses is required. Image forming apparatuses of various models are installed in an office, and the usage situation of each image forming apparatus may be different from the others. A technique of writing setting data into each image forming apparatus in a mode appropriate to each image forming apparatus even in that case is required.

SUMMARY

The present disclosure has been made in consideration of the problem, and an object of the present disclosure is to provide a technique of writing setting data into a plurality of image forming apparatuses in modes appropriate to the respective situations of the plurality of image forming apparatuses.

To achieve the abovementioned object, according to an aspect of the present invention, an image-forming-apparatus managing device reflecting one aspect of the present invention comprises: a memory that stores a plurality of pieces of setting data of an image forming apparatus; a communication interface that communicates with the image forming apparatus; and a hardware processor that writes the plurality of pieces of setting data into the image forming apparatus, wherein the hardware processor writes the plurality of pieces of setting data into the image forming apparatus in a mode appropriate to order of priority in the plurality of pieces of setting data based on a characteristic of the image forming apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a table of exemplary structure of a function-to-group conversion table;

FIG. 9 is a flowchart of a modification of the processing of FIG. 5;

FIG. 10 is a schematic table of an exemplary usage history of each function in an image forming apparatus.

DETAILED DESCRIPTION OF EMBODIMENTS

Hereinafter, one or more embodiments of an image forming system of the present invention will be described with reference to the drawings. However, the scope of the invention is not limited to the disclosed embodiments. The same components and constituent elements are denoted with the same reference signs in the following descriptions. The same components and constituent elements have the same designations and functions. Therefore, the descriptions thereof will be omitted.

1. Outline of Image Forming System

Figure 1:
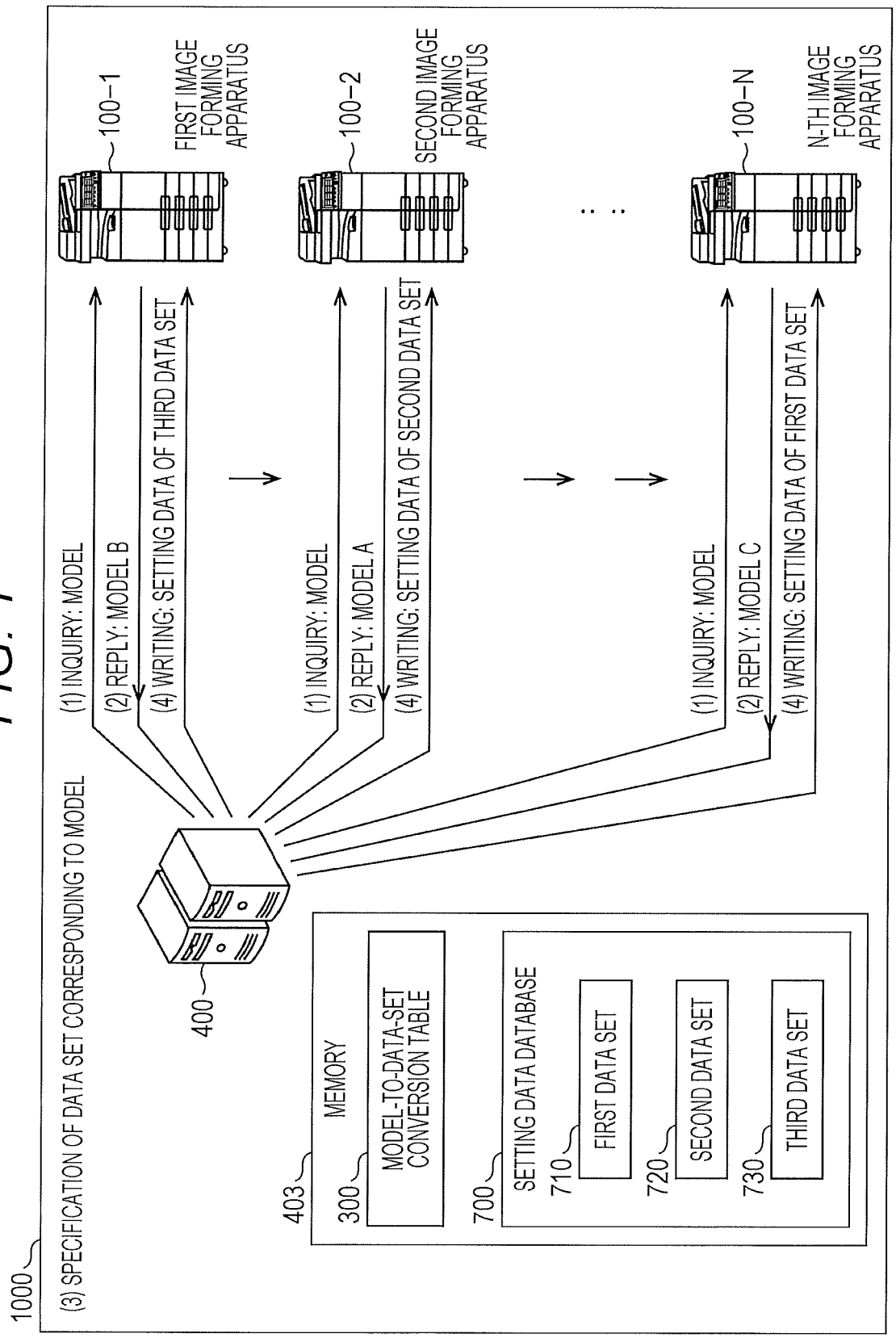
FIG. 1 is a diagram of an exemplary configuration of an image forming system according to an embodiment of the present disclosure.

FIG. 1 is a diagram of an exemplary configuration of an image forming system according to an embodiment of the present disclosure. The image forming system 1000 includes N number of image forming apparatuses 100 (image forming apparatuses 100-1, 100-2, . . . , 100-N in FIG. 1) and a remote setting tool 400. The image forming apparatuses 100 each are achieved by, for example, a multi-functional peripheral (MFP). The remote setting tool 400 is an exemplary managing device in the image forming system, and is achieved by, for example, a general-purpose computer.

The remote setting tool 400 communicates with each of the N number of image forming apparatuses 100 through a network, such as a local area network (LAN), and writes setting data into each image forming apparatus 100. Examples of the setting data include a set value relating to printing color (e.g., color), a set value relating to paper size (e.g., A3), and a set value relating to resolution in scanning (e.g., 300 dpi).

A memory 403 of the remote setting tool 400 stores a setting data database 700 including the setting data to be written into the image forming apparatuses 100. The setting data database 700 includes three data sets (first data set 710, second data set 720, and third data set 730). The memory 403 further stores a model-to-data-set conversion table 300 that associates the models of the image forming apparatuses 100 with the data sets in the setting data database 700.

The remote setting tool 400 inquires of each image forming apparatus 100 about the model of each image forming apparatus 100 (step (1) in FIG. 1). Each image forming apparatus 100 reports the model of each image forming apparatus 100 in response to the inquiry (step (2) in FIG. 1).

In order to specify a data set corresponding to the model of each image forming apparatus 100, the remote setting tool 400 prioritizes the plurality of data sets in the setting data database 700 as a data set to be written into each image forming apparatus 100, in accordance with the model of each image forming apparatus 100 (step (3) in FIG. 1). More specifically, the remote setting tool 400 gives top priority to the data set corresponding to the model.

Then, the remote setting tool 400 writes the setting data included in the data set given the top priority for each image forming apparatus 100, into each image forming apparatus 100 (step (4) in FIG. 1). In the example of FIG. 1, the model of the first image forming apparatus 100-1 is "model B", and the third data set 730 is given the top priority for model B. Therefore, the remote setting tool 400 writes the setting data of the third data set 730 into the first image forming apparatus 100-1.

The model of the second image forming apparatus 100-2 is "model A", and the second data set 720 is given the top priority for model A. Therefore, the remote setting tool 400 writes the setting data of the second data set 720 into the second image forming apparatus 100-2.

The model of the N-th image forming apparatus 100-N is "model C", and the first data set 710 is given the top priority for model C. Therefore, the remote setting tool 400 writes the setting data of the first data set 710 into the N-th image forming apparatus 100-N.

2. Hardware Configuration of Managing Device

Figures 2, 3:
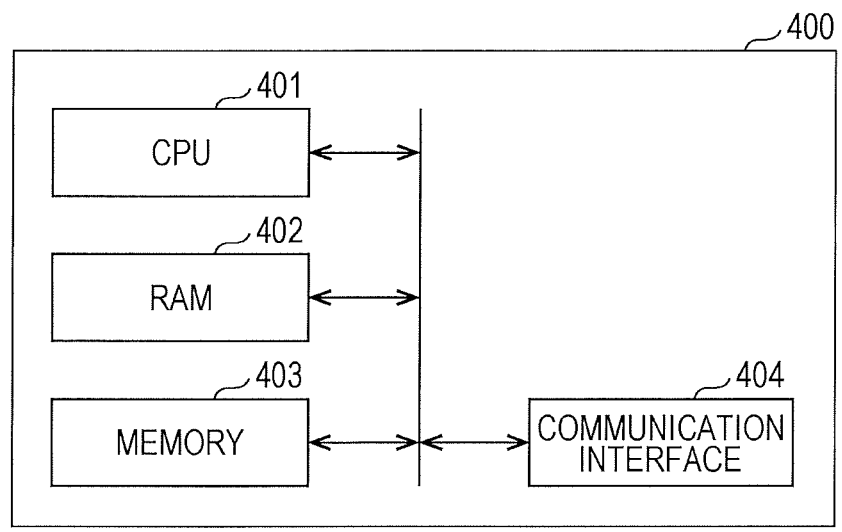
FIG. 2 is a diagram of an exemplary hardware configuration of a remote setting tool.
FIG. 3 is a table of an exemplary structure of a model-to-data-set conversion table stored in a memory.

FIG. 2 is a diagram of an exemplary hardware configuration of the remote setting tool 400. As illustrated in FIG. 2, the remote setting tool 400 includes a central processing unit (CPU) 401, a random access memory (RAM) 402, the memory 403, and a communication interface 404, as main constituent elements. The CPU 401, the RAM 402, the memory 403, and the communication interface 404 are mutually connected through an internal bus.

The CPU 401 is an exemplary arithmetic unit that executes a program to perform processing of controlling the remote setting tool 400. The RAM 402 functions as a work area when the CPU 401 performs the processing. The memory 403 is achieved by, for example, a hard disk, and stores the program to be executed by the CPU 401 and data to be used for the execution of the program. The communication interface 404 is equipment that communicates with various apparatuses (e.g., MFPs 100), and is achieved by, for example, a wireless communication circuit.

3. Model-to-Data-Set Conversion Table

FIG. 3 is a table of an exemplary structure of the model-to-data-set conversion table 300 stored in the memory 403. As illustrated in FIG. 3, the model-to-data-set conversion table 300 associates at least two models of image forming apparatuses 100 with corresponding data sets. In FIG. 3, "◯" represents correspondence between the model and the data set. "—" represents no correspondence between the model and the data set.

In the example of FIG. 3, model A corresponds to the second data set and model B corresponds to the third data set. Model C and model D correspond to the first data set.

4. Hardware Configuration of Image Forming Apparatus

Figure 4:
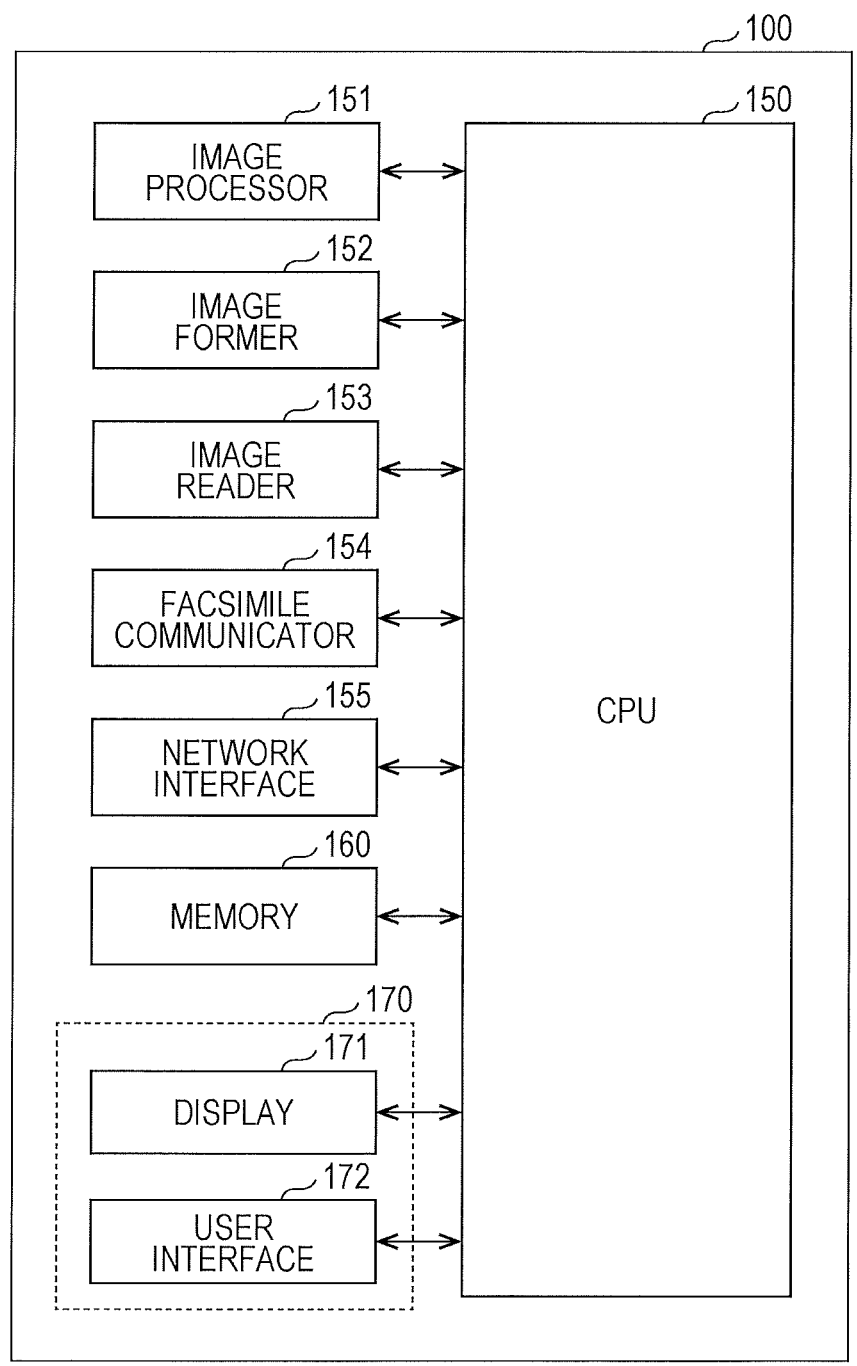
FIG. 4 is a schematic diagram of the hardware configuration of an image forming apparatus.

FIG. 4 is a schematic diagram of the hardware configuration of an image forming apparatus 100. Referring to FIG. 4, the image forming apparatus 100 includes: a CPU 150 that controls the image forming apparatus 100: a memory 160 that stores a program and data; and an operation panel 170.

The memory 160 stores a program to be executed by the CPU 150 and various types of data, and includes a non-volatile memory. The memory 160 stores the set value for each function in the image forming apparatus 100. In the image forming system 1000, the remote setting tool 400 writes the setting data into an area in which the set value of each function is to be stored in the memory 160.

The operation panel 170 includes a display 171 and a user interface 172. The display 171 includes, for example, at least one of a liquid crystal display and a plasma display. The user interface 172 receives an input operation to the image forming apparatus 100, and includes, for example, at least one of a touch sensor and a hardware button.

The image forming apparatus 100 further includes an image processor 151, an image former 152, an image reader 153, a facsimile communicator 154, and a network interface 155. The image processor 151 performs various types of processing including reduction and enlargement, to an input image. The image former 152 includes an element, such as a photoreceptor, that forms an image onto recording paper. The image reader 153 includes an element, such as a scanner, that generates image data of the original, and generates scanned data with scanning of the original. The facsimile communicator 154 includes an element, such as a modem, that transmits or receives image data with facsimile communication. The network interface 155 includes an element, such as a network card, that performs data communication through the network. The respective functions of the image processor 151, the image former 152, the image reader 153, the facsimile communicator 154, and the network interface 155 have been well known for image forming apparatuses, and thus the detailed descriptions thereof will be omitted here.

5. Flow of Processing

Figure 5:
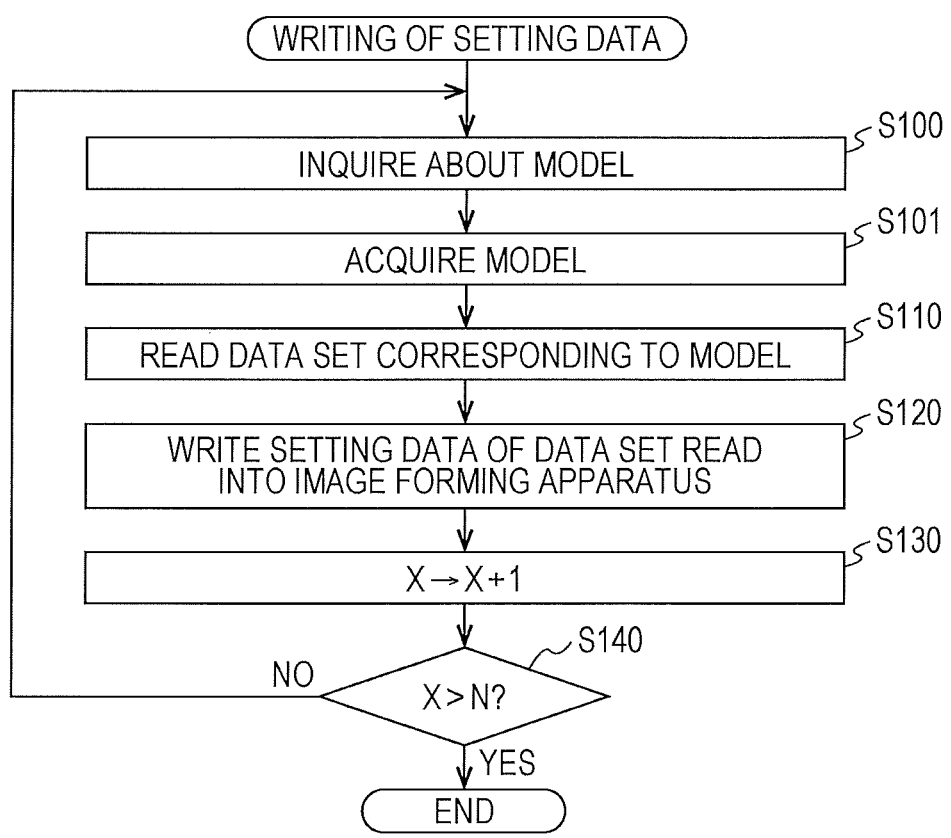
FIG. 5 is a flowchart of processing to be performed by a CPU of the remote setting tool in order to write setting data into each image forming apparatus.

FIG. 5 is a flowchart of the processing to be performed by the CPU 401 of the remote setting tool 400 in order to write the setting data into each image forming apparatus 100. The processing of FIG. 5 is achieved by, for example, execution of the given program by the CPU 401.

Referring to FIG. 5, at step S100, the CPU 401 inquires of the X-th image forming apparatus 100 in the image forming system 1000 about the model of the image forming apparatus 100. The value of "X" is a variable to be used in the processing of FIG. 5, and the initial value is "1". The first image forming apparatus 100 means the first image forming apparatus 100-1.

In response to the inquiry at step S100, the X-th image forming apparatus 100 notifies the remote setting tool 400 of the model of the image forming apparatus 100. For example, the memory 160 of the image forming apparatus 100 stores information specifying the model of the image forming apparatus 100. In response to the inquiry, the CPU 150 of the image forming apparatus 100 transmits the information to the remote setting tool 400. At step S101, the CPU 401 acquires the information specifying the model, as the reply to step S100, from the image forming apparatus 100.

At step S110, the CPU 401 reads the data set corresponding to the model of the image forming apparatus 100 acquired in response to the inquiry at step S100, from the setting data database 700, referring to the model-to-data-set conversion table 300.

At step S120, the CPU 401 writes the setting data included in the data set read at step S110, into the image forming apparatus 100.

At step S130, the CPU 401 updates the variable X with an addition of 1. At step S140, the CPU 401 determines whether the value of "X" has exceeded the value of "N". The value of "N" represents the number of image forming apparatuses 100 in the image forming system 1000. When determining that the value of "X" has not exceeded the value of "N" (NO at step S140), the CPU 401 returns the control to step S100. Otherwise (YES at step S140), the CPU 401 finishes the processing of FIG. 5.

According to the processing described above, the remote setting tool 400 prioritizes the plurality of data sets in the setting data database for each image forming apparatus 100, in accordance with the model of each image forming apparatus 100, and then writes the setting data included in the data set given the top priority, into each image forming apparatus 100. Note that the embodiment described with reference to FIGS. 1 to 5 is just exemplary. For example, the number of data sets in the setting data database is not limited to that illustrated in FIG. 1.

6. Modification of Image Forming System

Figure 6:
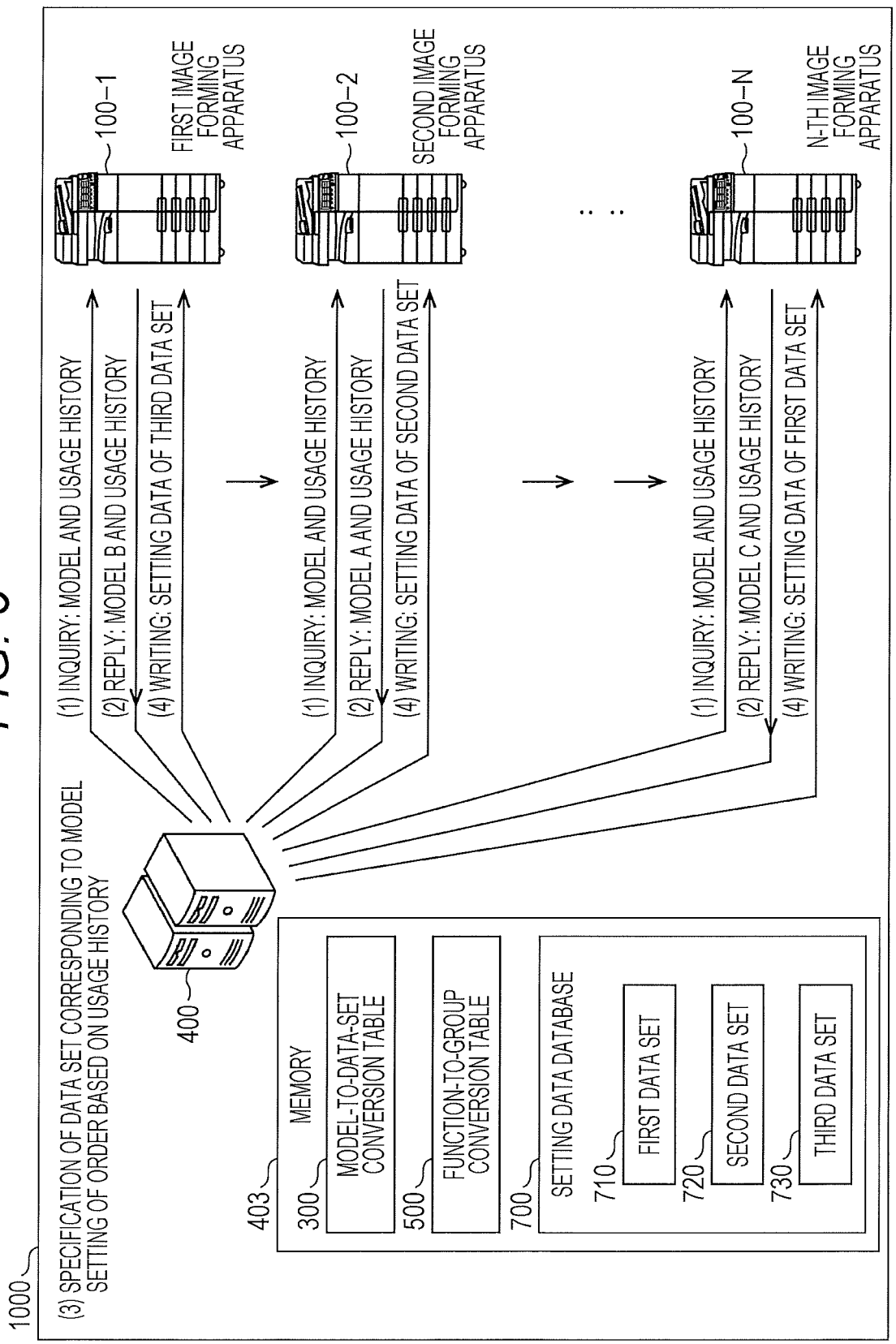
FIG. 6 is a diagram of the configuration of a modification of the image forming system.

FIG. 6 is a diagram of the configuration of a modification of the image forming system. In the image forming system 1000 illustrated in FIG. 6, the memory 403 of the remote setting tool 400 further stores a function-to-group conversion table 500.

As described with reference to FIG. 7, groups are defined for parts corresponding to the functions of an image forming apparatus 100 in each of the first data set 710, the second data set 720, and the third data set 730. The function-to-group conversion table 500 prescribes for the respective functions to which the groups correspond in each of the first data set 710, the second data set 720, and the third data set 730, as described later with reference to FIG. 8.

In the image forming system 1000 of FIG. 6, the remote setting tool 400 sets the order of writing of the groups for writing the setting data into each image forming apparatus 100, in accordance with a characteristic of each image forming apparatus 100 (e.g., usage history of each function). Thus, the remote setting tool 400 inquires of each image forming apparatus 100 about the usage history of each function together with the model of each image forming apparatus 100 (step (1)). In response to the inquiry, each image forming apparatus 100 reports the usage history of each function together with the model (step (2)). The remote setting tool 400 specifies the data set to be used in writing for each image forming apparatus 100, and additionally sets the order of writing of the plurality of groups included in the data set (step (3)). Then, the remote setting tool 400 writes the setting data included in the specified data set into each image forming apparatus 100 in the set order (step (4)).

7. Structure of Modification of Setting Data Database

Figure 7:
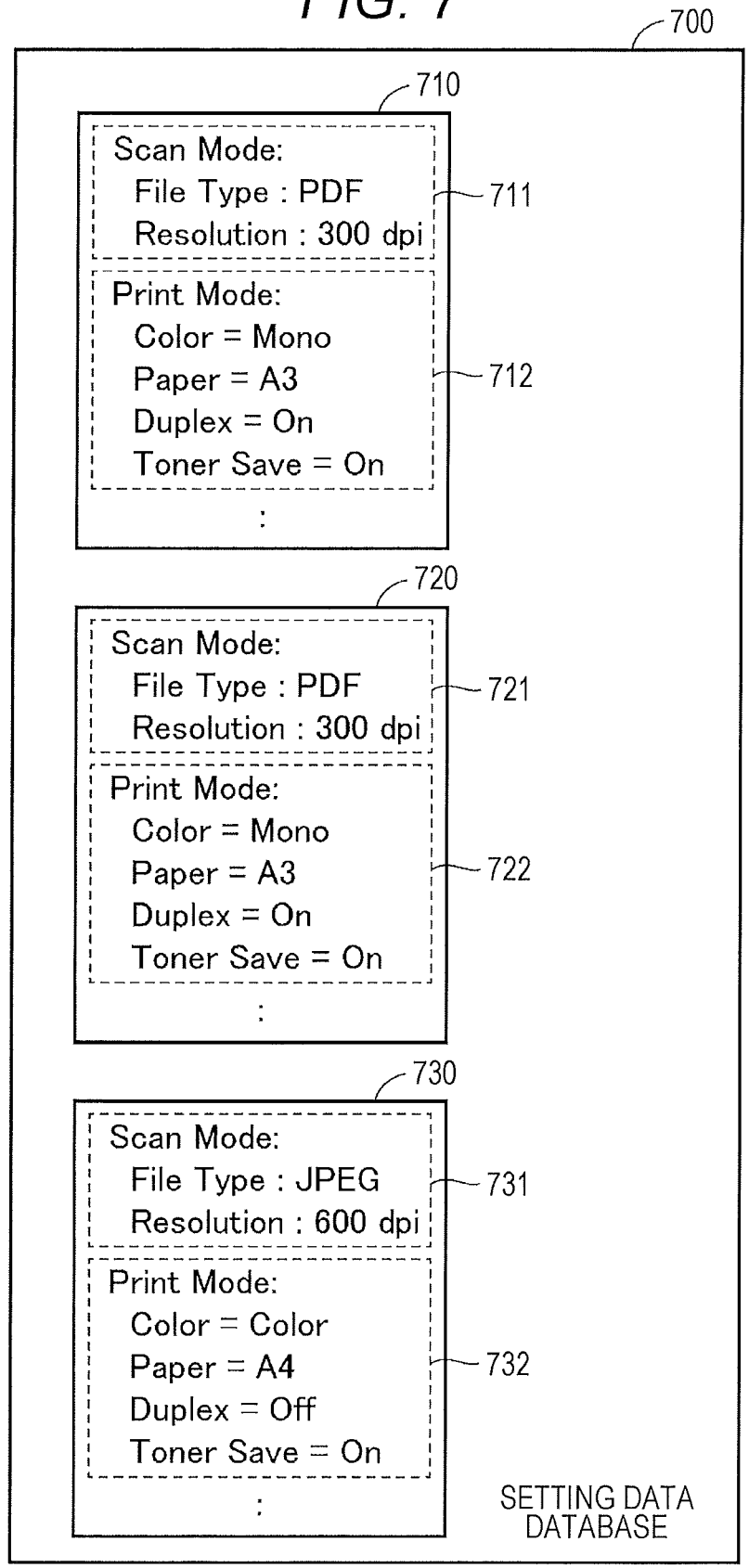
FIG. 7 is a diagram of the structure of a modification of a setting data database.

FIG. 7 illustrates the structure of a modification of the setting data database 700. As illustrated in FIG. 7, the setting data database 700 stores the first data set 710, the second data set 720, and the third data set 730.

The first data set 710 includes a first group 711 and a second group 712. The first group 711 corresponds to a scanning function. Data included in the first group 711 includes the set value of an item relating to a file type to be generated by scanning (File Type: PDF) and the set value of an item relating to resolution in scanning (Resolution: 300 dpi). The second group 712 corresponds to a printing function. Data included in the second group 712 includes the set value of an item relating to printing color (Color=Mono (single color printing)), the set value of an item relating to paper size (Paper=A3 (A3 paper)), the set value of an item relating to single-sided/double-sided printing (Duplex=On (double-sided printing on)), and the set value of an item relating to toner saving (Toner Save=On (toner saving on).

The second data set 720 includes a first group 721 and a second group 722. The third data set 730 includes a first group 731 and a second group 732. The first groups 711, 721, and 731 and the second groups 712, 722, and 732 each correspond to one function of an image funning apparatus 100. According to one embodiment, the memory 403 stores information specifying the range of the data of each group in each data set.

8. Function-to-Group Conversion Table

FIG. 8 is a table of an exemplary structure of the function-to-group conversion table 500. The function-to-group conversion table 500 associates the groups in each data set with the functions of an image forming apparatus 100.

In the first data set in the example of FIG. 8, the first group, the second group, and the third group are associated with the functions of "printing", "scanning", and "security communication" of the image forming apparatus 100, respectively. That is, the first group in the first data set includes the setting data relating to the printing function of the image forming apparatus 100. According to one embodiment, the printing function is a function of forming an image onto recording paper. The scanning function is a function of reading an image of the original and generating data of the image. The security communication function is a function of encrypting data with an electronic certificate and communicating with different equipment (e.g., a secure sockets layer (SSL) communication function).

The first group and the second group in the second data set, are associated with the functions of "printing" and "scanning" of the image forming apparatus 100, respectively. The first group, the second group, and the third group in the third data set, are associated with the functions of "printing", "scanning", and "security communication" of the image forming apparatus 100, respectively.

According to the present embodiment, when the remote setting tool 400 writes the setting data relating to the security communication function, into an image forming apparatus 100, the image forming apparatus 100 may be required to access an external device. The security communication may use the electronic certificate. In a case where the electronic certificate has not been installed in the image forming apparatus 100 in writing the setting data relating to the security communication function into the image forming apparatus 100, the remote setting tool 400 may request the image forming apparatus 100 to acquire the electronic certificate. In response to the request, the image forming apparatus 100 accesses a certificate authority in order to acquire the electronic certificate.

9. Flow of Processing

FIG. 9 is a flowchart of a modification of the processing of FIG. 5. The processing of FIG. 9 is achieved by, for example, execution of the given program by the CPU 401.

Referring to FIG. 9, at step S102, the CPU 401 inquires of the X-th image loaning apparatus 100 about the model of the image forming apparatus 100 and the usage history of each function. In response to the inquiry, the image forming apparatus 100 reports the usage history of each function in the image forming apparatus 100 together with the model of the image forming apparatus 100. At step S103, the CPU 401 acquires the model and the usage history of each function, as the reply to step S102, from the image forming apparatus 100.

FIG. 10 is a schematic table of an exemplary usage history of each function in an image forming apparatus 100. As illustrated in FIG. 10, the image forming apparatus 100 reports the usage of each function in the image forming apparatus 100. In the example of FIG. 10, the usage of the printing function, the usage of the scanning function, and the usage of the security communication function are 2056, 45, and 600, respectively.

Referring back to FIG. 9, as step S110, the CPU 401 reads the data set corresponding to the model acquired at step S103, from the setting data database 700.

At step S122, the CPU 401 changes the order of the groups of the data in the data set read at step S110 in accordance with the usage histories, and then writes the setting data of each group into the image forming apparatus 100 in the changed order. As an exemplary order based on the usage histories, the setting data of the group corresponding to a function having a larger amount of usage, is preferentially positioned in front. In the example of FIG. 10, the printing function has the largest amount of usage. The usage of the security communication function is large after that, and the usage of the scanning function is large subsequently. In this case, the order of setting data is set in the data set such that the setting data of the group corresponding to the printing function is preferentially positioned in front, the setting data of the group corresponding to the security communication function is positioned after that, and the setting data of the group corresponding to the scanning function is positioned subsequently.

Figure 11:
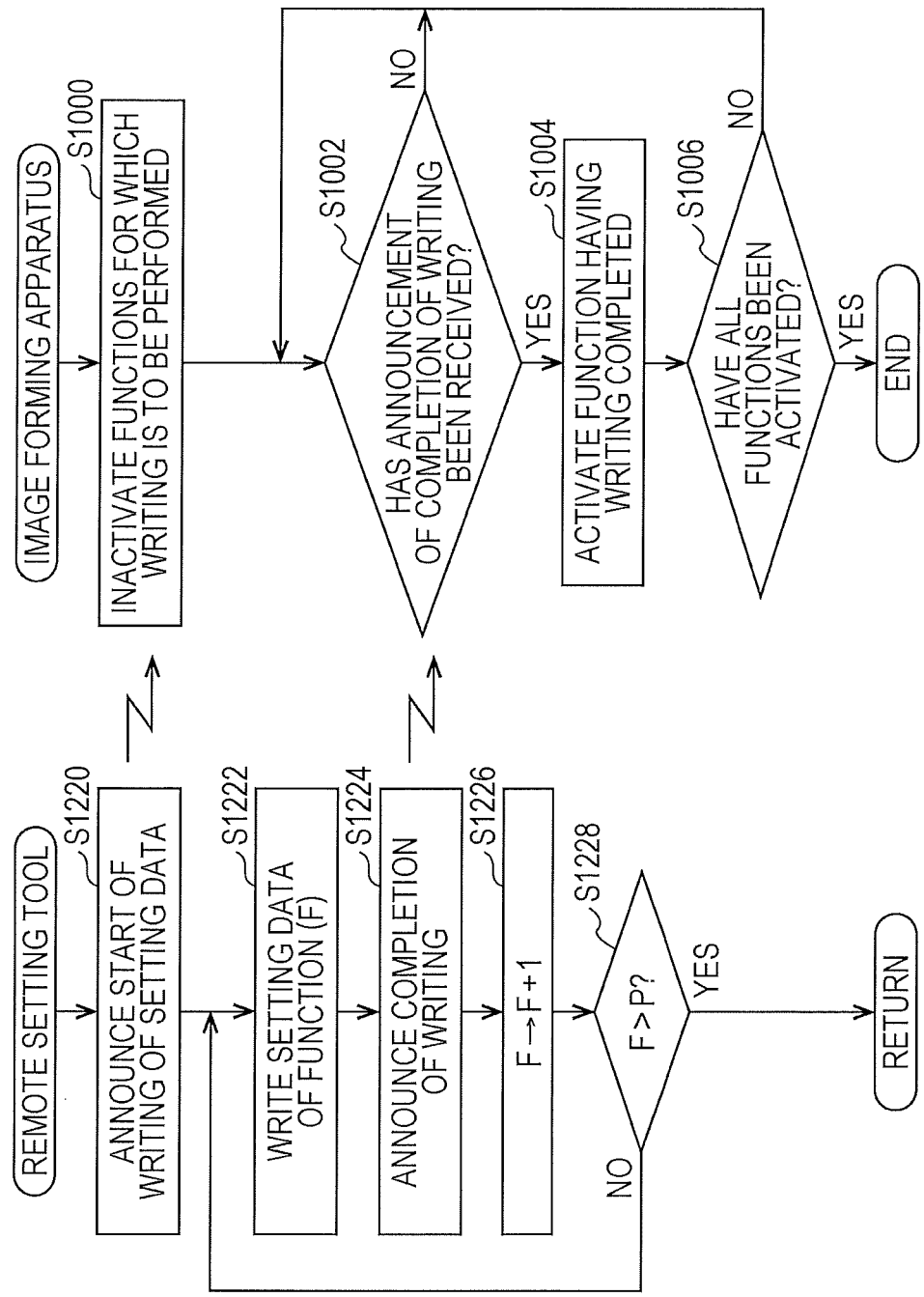
FIG. 11 is a flowchart for describing the processing of writing the data at step of FIG. 9 in detail.

FIG. 11 is a flowchart for describing the processing of writing the data at step S122 of FIG. 9 in detail. The flowchart of the processing (subroutine) by the CPU 401 of the remote setting tool 400, is illustrated on the left of FIG. 11. The processing is achieved by, for example, execution of the given program by the CPU 401. The flowchart of the processing by the CPU 150 of the image forming apparatus 100, is illustrated on the right of FIG. 11. The processing is achieved by, for example, execution of the given program by the CPU 150.

At step S1220, the CPU 401 of the remote setting tool 400 notifies the image forming apparatus 100 of the start of writing of the setting data. In response to the notification, at step S1000, the CPU 150 of the image forming apparatus 100 inactivates the functions for which the setting data is to be written, in the image forming apparatus 100.

At step S1222, the CPU 401 of the remote setting tool 400 writes the setting data of the function (F) into the image forming apparatus 100 (memory 160). The value of F is a variable to be used in the processing of FIG. 11, and the initial value is "1". The value of F indicates what ordinal number function is for which the setting data is to be written.

After completion of the writing of the setting data of the function (F) at step S1222, the CPU 401 of the remote setting tool 400 notifies the image forming apparatus 100 of the completion at step S1224.

At step S1002, the CPU 150 of the image forming apparatus 100 determines whether the notification of the completion of the writing of the setting data has been received from the remote setting tool 400. When determining that the notification has been received (YES at step S1002), the CPU 150 causes the control to proceed to step S1004. Otherwise (NO at step S1002), the control stays at step S1002. In response to the notification at step S1224, the CPU 150 causes the control to proceed to step S1004.

At step S1004, the CPU 150 activates the function having the writing of the setting data completed, from the functions inactivated at step S1000. For example, in a case where the setting data of the printing function is to be written, the CPU 150 inactivates the printing function of the image forming apparatus 100 at step S1000. After completion of the writing of the setting data of the printing function, the CPU 150 activates the printing function of the image forming apparatus 100 at step S1004.

At step S1006, the CPU150 determines whether all the functions inactivated at step S1000 have been activated. When determining that all the functions inactivated have been activated (YES at step S1006), the CPU 150 finishes the processing on the image forming apparatus 100 side in the processing of FIG. 11. Otherwise (NO at step S1006), the CPU 150 returns the control to step S1002.

At step S1226, the CPU 401 of the remote setting tool 400 updates the value of F with an addition of 1. At step S1228, the CPU 401 determines whether the value of F has exceeds the value of P. The value of P indicates the number of functions for which the setting data is to be written into the image forming apparatus 100 in the processing on the left of FIG. 11. When determining that the value of F has exceeded the value of P (YES at step S1228), the CPU 401 returns the control to FIG. 9. Otherwise (NO at step S1228), the control goes back to step S1222.

Referring back to FIG. 9, the CPU 401 updates the value of X with an addition of 1 at step S130. At step S140, the CPU 401 determines whether the value of X has exceeded the value of N. The value of N indicates the number of image forming apparatuses 100 included in the image forming system 1000. When determining that the value of X has exceeded the value of N (YES at step S140), the CPU 401 finishes the processing of FIG. 9. Otherwise (NO at step S140), the control goes back to step S102.

According to the processing described with reference to FIGS. 9 to 11 described above, when writing the setting data into each image forming apparatus 100, the remote setting tool 400 prioritizes the groups in the data set for the writing, in accordance with the usage history of each function in each image forming apparatus 100, to write the setting data in the order based on the priority.

The writing of the setting data into each image forming apparatus 100 may be performed after approval on each image forming apparatus 100 side. According to one embodiment, after the notification of the start of the writing at step S1220, the CPU 401 of the remote setting tool 400 may start the writing, subject to reception of information regarding approval of the writing from the image forming apparatus 100. The CPU 150 of the image forming apparatus 100 may display a screen inquiring whether the writing of the setting data is to be given approval, onto the display 171 in response to the notification. When a user operates the user interface 172 in accordance with the screen to input the information regarding the approval of the writing, the CPU 150 may transmit the information regarding the approval of the writing, to the remote setting tool 400.

According to one embodiment, the setting data corresponding to a function having a large amount of usage (high frequency of usage), is preferentially written. When the setting data is written, the function corresponding to the setting data is changed from the inactive state to the active state. In this manner, if the frequency of usage of the function is high, the function becomes active preferentially. The CPU 150 of the image forming apparatus 100 may successively display a screen indicating which function is inactive and which function is active, onto the display 171.

10. Summary of Disclosure

The present disclosure is summarized as below.

A managing device (remote setting tool 400) includes: a memory (memory 403) that stores a plurality of pieces of setting data of an image forming apparatus; a communication interface (communication interface 404) that communicates with the image forming apparatus; and a processor (CPU 401) that writes the setting data into the image forming apparatus. The processor writes the setting data into the image forming apparatus in a mode appropriate to the order of priority in the plurality of pieces of setting data based on a characteristic of the image forming apparatus (refer to FIGS. 5, 9, and 11).

Note that the order of priority in the setting data may be set in accordance with a different characteristic of the image forming apparatus. For example, the order of priority in the setting data may be set on the basis of the functions for each model. More specifically, the setting data corresponding to the printing function is given high priority for model A. This arrangement allows the setting data corresponding to the printing function to be preferentially written (foremost) into an image forming apparatus 100 of model A. According to one embodiment, a time during which the printing function is inactive, shortens in the image forming apparatus 100 of model A.

The plurality of setting data may include at least two setting-data sets (first data set 710, second data set 720, and third data set 730). The memory may store first information (model-to-data-set conversion table 300) that associates the model of the image forming apparatus with at least one setting-data set of the at least two setting-data sets. The processor may acquire the model of the image forming apparatus as the characteristic (step S101). The processor may write the setting data in the setting-data set associated with the model from the at least two setting-data sets in the first information, into the image forming apparatus.

The memory may store second information (function-to-group conversion table 500) that associates each function of the image forming apparatus with at least one piece of setting data. The processor may further acquire information regarding the functions included in the image forming apparatus as the characteristic (step S103).

The functions may include a function (security communication function) for which the image forming apparatus needs to access an external device when the setting data of each of the functions is written.

The information regarding the functions included in the image forming apparatus, may include the respective usage histories of the functions in the image forming apparatus (refer to FIG. 10). The processor may write the setting data of each function into the image forming apparatus in descending order of the frequency of usage of the functions in the image forming apparatus (step S122).

The communication interface may communicate with a plurality of image forming apparatuses through a network or with a peer-to-peer connection. That is, the communication interface 404 may be a network card for wireless communication or a network card for wired communication. Alternatively, the communication interface may be a USB memory hub. The hub may have a USB connection with at least one image forming apparatus 100.

The managing device may be integrally formed with the image forming apparatus 100. In this case, the processor of the managing device is achieved by the CPU 150 of the image forming apparatus 100.

Although embodiments of the present invention have been described and illustrated in detail, the disclosed embodiments are made for purposes of illustration and example only and not limitation. The scope of the present invention should be interpreted by terms of the appended claims. It is intended that the scope of the present invention includes the meaning of equivalents of the scope of the claims and all alternations in the scope thereof. It is intended that the invention described in the embodiments and modifications is carried out independently or integrally wherever possible.

What is claimed is:

1. An image-forming-apparatus managing device comprising:
   a memory that stores a plurality of pieces of setting data of a plurality of image forming apparatuses having different characteristics;
   a communication interface that communicates with an image forming apparatus and obtains characteristics of the image forming apparatus; and
   a hardware processor that writes the plurality of pieces of setting data into the image forming apparatus, wherein
   the hardware processor writes the plurality of pieces of setting data into the image forming apparatus in accordance with an order of priority in the plurality of pieces of setting data determined based on at least one obtained characteristic of the image forming apparatus,
   the plurality of pieces of setting data includes at least two setting-data sets,
   the memory stores first information that associates a model of the image forming apparatus with at least one setting-data set of the at least two setting-data sets,
   the hardware processor acquires the model of the image forming apparatus as the characteristic, and writes the plurality of pieces of setting data in the at least one setting-data set associated with the model from the at least two setting-data sets in the first information, into the image forming apparatus,
   the memory stores second information that associates each function of the image forming apparatus with at least one piece of setting data,
   the hardware processor further acquires information regarding the functions included in the image forming apparatus as the characteristic, and prioritizes the at least one piece of setting data for each of the functions of the image forming apparatus in accordance with the characteristic, and
   the hardware processor, after writing each piece of setting data into the image forming apparatus, changes a state of the function of the image forming apparatus corresponding to the piece of setting data from an inactive state to an active state.

2. The image-forming-apparatus managing device according to claim 1, wherein the functions include a function for which the image forming apparatus needs to access an external device when the at least one piece of setting data for each of the functions is written.

3. The image-forming-apparatus managing device according to claim 1, wherein the information regarding the functions included in the image forming apparatus includes respective usage histories of the functions in the image forming apparatus, and
the hardware processor writes the at least one piece of setting data of each of the functions into the image forming apparatus in descending order of frequency of usage of the functions in the image forming apparatus.

4. The image-forming-apparatus managing device according to claim 1, wherein the communication interface communicates with the image forming apparatus through a network or with a peer-to-peer connection.

5. The image-forming-apparatus managing device according to claim 1, wherein the image forming apparatus is integrally included.

6. An image-forming-apparatus managing method to be achieved by a computer of a managing device that writes a plurality of setting data into an image forming apparatus, the image-forming-apparatus managing method comprising:
determining an order of priority of the plurality of pieces of setting data based on at least one obtained characteristic of the image forming apparatus; and
writing the plurality of pieces of setting data into the image forming apparatus in accordance with the determined order of priority, wherein
the plurality of pieces of setting data including at least two setting-data sets,
at least one setting-data set of the at least two setting-data sets being stored in association with a model of the image forming apparatus,
the image-forming-apparatus managing method further comprising: acquiring the model of the image forming apparatus as the characteristic,
the writing the plurality of pieces of setting data into the image forming apparatus includes writing the plurality of pieces of setting data in the at least one setting-data set associated with the model from the at least two setting-data sets, into the image forming apparatus,
at least one piece of setting data of the plurality of pieces of setting data being stored in association with each function of the image forming apparatus,
the image-forming-apparatus managing method further comprising: acquiring information regarding the functions included in the image forming apparatus as the characteristic,
the prioritizing includes prioritizing the at least one piece of setting data for each of the functions of the image forming apparatus, in accordance with the characteristic, and
the image-forming-apparatus managing method further comprising: after writing each piece of setting data into the image forming apparatus, changing a state of the function of the image forming apparatus corresponding to the piece of setting data from an inactive state to an active state.

7. An image forming system comprising:
the image-forming-apparatus managing device according to claim 1; and
the plurality of image forming apparatuses.

8. The image-forming-apparatus managing device according to claim 1, further comprising a screen, wherein the hardware processor further causes the screen to indicate which functions are in the inactive state and which functions are in the active state.

9. A non-transitory recording medium storing a computer readable image-forming-apparatus managing program causing a computer of a managing device that manages a plurality of image forming apparatuses, to perform the prioritizing and the writing in the method according to claim 6.

10. The image-forming-apparatus managing method according to claim 6, wherein the functions include a function for which the image forming apparatus needs to access an external device when the at least one piece of setting data for each of the functions is written.

11. The image-forming-apparatus managing method according to claim 6, wherein the information regarding the functions included in the image forming apparatus includes respective usage histories of the functions in the image forming apparatus,
the writing the plurality of pieces of setting data into the image forming apparatus includes writing the at least one piece of setting data of each of the functions into the image forming apparatus in descending order of frequency of usage of the functions in the image forming apparatus.

12. The image-forming-apparatus managing method according to claim 6, wherein the writing the plurality of pieces of setting data into the image forming apparatus includes communicating with the image forming apparatus through a network or with a peer-to-peer connection.

13. The image-forming-apparatus managing method according to claim 6, wherein the managing device includes the image forming apparatus integrally.

14. The image-forming-apparatus managing method according to claim 6, further comprising causing a screen to indicate which functions are in the inactive state and which functions are in the active state.

* * * * *